(12) United States Patent
Shiina et al.

(10) Patent No.: US 10,668,653 B2
(45) Date of Patent: Jun. 2, 2020

(54) DECORATIVE SHEET AND DECORATIVE MOLDED ARTICLE

(71) Applicant: SEIKO ADVANCE LTD., Tokyo (JP)

(72) Inventors: Kenichi Shiina, Hasuda (JP); Mitsuhiro Maeda, Hasuda (JP); Shinichi Harada, Hasuda (JP); Kiyokazu Nagayama, Kawasaki (JP)

(73) Assignee: SEIKO ADVANCE LTD., Tokyo (JP)

( * ) Notice: Subject to any disclaimer, the term of this patent is extended or adjusted under 35 U.S.C. 154(b) by 0 days.

(21) Appl. No.: 16/628,153

(22) PCT Filed: Jul. 13, 2018

(86) PCT No.: PCT/JP2018/026477
§ 371 (c)(1),
(2) Date: Jan. 2, 2020

(87) PCT Pub. No.: WO2019/013321
PCT Pub. Date: Jan. 17, 2019

(65) Prior Publication Data
US 2020/0122367 A1    Apr. 23, 2020

(30) Foreign Application Priority Data
Jul. 14, 2017  (JP) .................................. 2017-137738

(51) Int. Cl.
*B32B 7/02*   (2019.01)
*B29C 45/14*  (2006.01)
(Continued)

(52) U.S. Cl.
CPC ................ *B29C 45/14* (2013.01); *B44C 3/02* (2013.01); *B44F 1/02* (2013.01)

(58) Field of Classification Search
CPC .............. B29C 45/14; B44C 3/02; B44F 1/02
(Continued)

(56) References Cited

U.S. PATENT DOCUMENTS

| | | | |
|---|---|---|---|
| 6,439,708 B1 * | 8/2002 | Kato | ......................... B41J 2/01 347/100 |
| 8,784,971 B2 | 7/2014 | Konda et al. | |

(Continued)

FOREIGN PATENT DOCUMENTS

| | | |
|---|---|---|
| JP | 2009-255373 A | 11/2009 |
| JP | 2011-235478 A | 11/2011 |

(Continued)

OTHER PUBLICATIONS

International Search Report, issued in PCT/JP2018/026477, PCT/ISA/210, dated Aug. 14, 2018.

(Continued)

*Primary Examiner* — Tahseen Khan
(74) *Attorney, Agent, or Firm* — Birch, Stewart, Kolasch & Birch, LLP (57) ABSTRACT

Provided is a decorative sheet (100) including: a transmissive substrate (10) which is sheet-like or plate-like; a light reflective projection portion (20) formed over the light transmissive substrate (10); and a black layer (30) formed over the light reflective projection portion (20), in which an average height of the light reflective projection portions (20) is 1 to 200 pm, and the black layer (30) is formed by using a black ink satisfying conditions below.

5 Claims, 5 Drawing Sheets

(51) Int. Cl.
   *B44F 1/02* (2006.01)
   *B44C 3/02* (2006.01)
(58) Field of Classification Search
   USPC .......................................................... 428/156
   See application file for complete search history.

(56) References Cited

U.S. PATENT DOCUMENTS

| | | | |
|---|---|---|---|
| 9,555,622 B2 * | 1/2017 | Yanagisawa | B41J 2/0451 |
| 2005/0139338 A1 * | 6/2005 | Shibatani | B41M 5/52 |
| | | | 162/125 |
| 2011/0159243 A1 * | 6/2011 | Ahn | B32B 38/06 |
| | | | 428/164 |
| 2011/0274881 A1 | 11/2011 | Konda et al. | |

FOREIGN PATENT DOCUMENTS

| | | |
|---|---|---|
| JP | 2013-132820 A | 7/2013 |
| JP | 2014-177002 A | 9/2014 |
| JP | 2017-19251 A | 1/2017 |
| JP | 2017-113962 A | 6/2017 |

OTHER PUBLICATIONS

Written Opinion of the International Searching Authority, issued in PCT/JP2018/026477, PCT/ISA/237, dated Aug. 14, 2018.

\* cited by examiner

DECORATIVE SHEET AND DECORATIVE MOLDED ARTICLE

TECHNICAL FIELD

The present invention relates to a decorative sheet and a decorative molded article.

BACKGROUND ART

In the related art, as a decorative sheet having various designs, a laminated sheet utilizing an uneven surface on a transparent substrate is known.

For example, Patent Document 1 discloses a decorative material in which a transparent substrate having a fine uneven portion on an upper surface, a colored transparent layer, and a black layer are laminated in this order, in order to obtain a vivid colored pattern using jet black as a background.

In addition, Patent Document 2 discloses decorative printed matter including a light transmissive resin substrate on which an uneven pattern having grooves was formed and an ink film covering the uneven pattern in order to obtain an excellent visibility of a pattern and obtain an appropriate metallic feeling. Then, it is disclosed that particles of a black pigment contained in the ink film become in a state of being densely arranged along the grooves, whereby a desired light reflecting surface is formed.

Patent Document 3 discloses a decorative sheet in which a transparent substrate, a printed layer that is formed on a portion of a back surface of the transparent substrate and has a thickness of equal to or more than 20 μm, and a colored print layer are laminated in order to make a pattern appear stereoscopically, in which the colored printed layer is formed by coating the printed layer with a colored ink containing a solvent having a low solubility.

RELATED DOCUMENT

Patent Document

[Patent Document 1] Japanese Unexamined Patent Publication No. 2009-255373
[Patent Document 2] Japanese Unexamined Patent Publication No. 2011-235478
[Patent Document 3] Japanese Unexamined Patent Publication No. 2013-132820

SUMMARY OF THE INVENTION

Technical Problem

Along with the diversification of design of a decorative sheet, the present inventors intensively conducted a study on decorative sheets having new designs, and found a new object of realizing a bright high-grade decorative sheet with a large contrast between light and shadow. Then, the technique disclosed in Patent Documents 1 to 3 described above was not able to achieve the object.

That is, the technique disclosed in Patent Document 1 was intended to obtain a vivid colored pattern in which deep and luxurious jet black was used as background color by causing the black layer to absorb light. However, a degree of difference in a pattern seen depending on a viewing angle was weak, a degree of jet black was not sufficient, and there was room for improvement from a viewpoint of the contrast between light and shadow.

In addition, in the technique disclosed in Patent Document 2, the particles of the black pigment were cased to be in a state of being densely arranged along the grooves, whereby a light reflecting surface including the black pigment is formed to emerge the uneven pattern in the jet black. However, the degree of the jet black was not sufficient and it was insufficient from a viewpoint of the contrast between light and shadow.

In addition, the technique disclosed in Patent Document 3 was focused on obtaining a stereoscopic effect of a pattern by the printed layer having a thickness of equal to or more than 20 μm and the colored printed layer covering the printed layer. It was found that a better stereoscopic effect can be obtained in a case where a black ink which is hardest to reflect light was used for the colored printed layer. That is, it was focused that the black layer absorbs light, there was room for improvement from a viewpoint of the contrast between light and shadow.

The present inventors intensively conducted a study in order to obtain a bright high-grade decorative sheet with a large contrast between light and shadow, and as a result, have found that it is effective to form a black layer by using a black ink satisfying a predetermined condition as described below to combine with a light reflective projection portion.

That is, in a dried coated film which is formed using the black ink by a film forming method below, conditions that a gloss value of a surface of the dried coated film, which is measured at a measurement angle of 60° in accordance with JIS Z 8741 (1997) is equal to or more than 80 and the lightness L* value of the surface of the dried coated film in the CIE 1976 (L*, a*, and b*) color system, which is measured by an SCE method is equal to or less than 10 are satisfied, it is possible to realize a bright high-grade decorative sheet with a large contrast between light and shadow.

Film forming method of dried coated film: The black ink is applied to a polyethylene terephthalate film by using a bar coater having a wire diameter of 6 mil by pulling at a moving speed of 50 mm/sec and then dried at 80° C. for 15 minutes to obtain a dried coated film.

Solution to Problem

The present invention provides a decorative sheet including: a light transmissive substrate which is sheet-like or plate-like; a light reflective projection portion formed over the light transmissive substrate; and a black layer formed over the light reflective projection portion, in which an average height of the light reflective projection portions is 1 to 200 μm, and the black layer is formed by using a black ink satisfying conditions below.

[Conditions]

In a dried coated film which is formed using the black ink by a film forming method below, a gloss value of a surface of the dried coated film, which is measured at a measurement angle of 60° in accordance with JIS Z 8741 (1997) is equal to or more than 80 and a lightness L* value of the surface of the dried coated film in the CIE 1976 (L*, a*, and b*) color system, which is measured by an SCE method is equal to or less than 10.

Film forming method of dried coated film: The black ink is applied to a polyethylene terephthalate film by using a bar coater having a wire diameter of 6 mil by pulling at a moving speed of 50 mm/sec and then dried at 80° C. for 15 minutes to obtain a dried coated film.

In addition, the present invention provides a decorative molded article including, on a surface, the decorative sheet described above.

In addition, the present invention provides a decorative sheet including a light transmissive substrate; a light reflective projection portion formed over the light transmissive substrate; and a black layer formed over the light reflective projection portion by using a black ink, in which, in a dried coated film which is formed using the black ink by a film forming method below, a gloss value of a surface of the dried coated film, which is measured at a measurement angle of 60° in accordance with JIS Z 8741 (1997) is equal to or more than 80 and a lightness L* value of the surface of the dried coated film in the CIE 1976 (L*, a*, and b*) color system, which is measured by an SCE method is equal to or less than 10.

Film forming method of dried coated film: The black ink is applied to a polyethylene terephthalate film by using a bar coater having a wire diameter of 6 mil by pulling at a moving speed of 50 mm/sec and then dried at 80° C. for 15 minutes to obtain a dried coated film.

Advantageous Effects of Invention

According to the present invention, a bright high-grade decorative sheet with a large contrast between light and shadow is realized.

BRIEF DESCRIPTION OF THE DRAWINGS

The objects described above, other objects, features, and advantages will become more apparent from the description of the following preferred embodiments and accompanying drawings.

DESCRIPTION OF THE EMBODIMENTS

Hereinafter, preferred embodiments of a decorative sheet according to the present invention will be described in detail with reference to the drawings. In the description of the drawings, the same symbols are attached to the same elements, and duplicate descriptions will not be repeated.

<Decorative Sheet>

Figure 1:
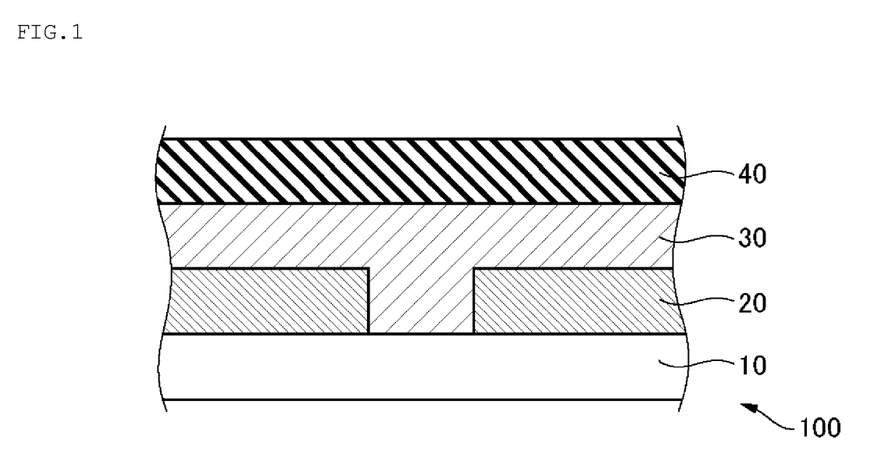
FIG. 1 is a schematic sectional diagram of a decorative sheet according to the present embodiment.

As shown in FIG. 1, the decorative sheet 100 is obtained by laminating a light transmissive substrate 10, a light reflective projection portion 20 formed on the light transmissive substrate 10, a black layer 30 which is formed on the light reflective projection portion 20 and includes a black ink, and a protective layer 40, in this order. When the decorative sheet 100 is viewed from a light transmissive substrate 10 side, a unique design effect is obtained by the light reflective projection portion 20 by using the black layer 30 as a background.

The light transmissive substrate 10 allows external light to pass through or emits light reflected inside the decorative sheet 100 to the outside. Visible light transmittance is preferably equal to or more than 90% and more preferably equal to or more than 95%. The light transmissive substrate 10 may be colorless or colored.

The light transmissive substrate 10 is not particularly limited, and is preferably formed using a transparent resin plate, a glass plate, and a transparent ceramic plate, and a composite material thereof. Examples of a transparent resin include one or more selected from a polyester resin, an acrylic resin, a polyethylene terephthalate resin, a polycarbonate resin, a polyvinyl chloride resin, and a polystyrene resin. Among these, it is preferable to be formed by using a composite material of the polycarbonate resin, the polyethylene terephthalate resin, the acrylic resin, or the polycarbonate resin and the acrylic resin. In addition, the glass plate may be subjected to tempering treatment or may be untreated. These can be appropriately selected according to the use or purpose of the decorative sheet 100.

In addition, the light transmissive substrate 10 may be a single layer or multiple layers, as long as it transmits the light. A thickness of the light transmissive substrate 10 is not particularly limited, and is preferably 100 μm to 5 mm.

The light transmissive substrate 10 is sheet-like, plate-like, or film-like, and at least one surface thereof is flat. From a viewpoint of obtaining an action by the light reflective projection portion 20 to be described later, it is preferable that the light transmissive substrate 10 is flat and the light reflective projection portion 20 is formed along the flat surface of the light transmissive substrate 10.

The light reflective projection portion 20 has a function of reflecting the light transmitted through the light transmissive substrate 10 and further reflecting the light reflected by a surface or the like of the black pigment included in the black ink forming the black layer 30.

The light reflective projection portion 20 is formed in a region over the surface of the light transmissive substrate 10 and may be formed on the surface of the light transmissive substrate 10. The expression "formed in a region over the surface of the light transmissive substrate 10" means that a projection portion obtained as a result of forming a recess on the surface of the light transmissive substrate 10 by the grooves is not included in the light reflective projection portion 20.

The light reflective projection portion 20 may be formed of different materials from or may be formed of the same material as the light transmissive substrate 10. From a viewpoint of obtaining brightness with a large contrast between light and shadow, the light reflective projection portion 20 is preferably formed of a material having a relatively small difference in refractive index.

The light reflective projection portion 20 may be singly formed or continuously formed, and may be formed in combination thereof.

The case of the single light reflective projection portion 20 means, for example, a case where a projection portion is formed punctiform (in a dot shape). In addition, the case of the continuous light reflective projection portion 20 means a case where the projection portions are continuous such that when seen in a plan view, the projection portion appears to draw a line.

In addition, the light reflective projection portion 20 is preferably used in the plural. The single light reflective projection 20 may be formed in the plural or continuous light reflective projections 20 may be formed in the plural, and these may also be formed in combination. That is, a pattern may be formed by plural lines, dots, and the like obtained from the light reflected projection portion 20, when seen in a plan view. The pattern is not particularly limited, and examples thereof include a spin pattern formed of a plurality of concentric circles, a hairline pattern formed of a plurality of thin lines in one direction, a so-called carbon pattern formed of a regular combination of a group of a plurality of thin lines in one direction and a group of thin lines in a direction substantially perpendicular thereto, and other geometric patterns.

The sectional shape of the light reflective projection portion 20 may be a mountain shape, a trapezoid shape, a polygonal shape, a substantially semicircular shape, or a substantially semi-elliptical shape, and is preferably the substantially semicircular shape or the substantially semi-elliptical shape. The same effect as that of a concave mirror is exhibited by providing the substantially semicircular shape or the substantially semi-elliptical shape. Accordingly, the reflected light on the surface of the light reflective projection portion 20 can be converged without being diffused. Accordingly, the seen pattern is greatly different depending on the viewing angle (directivity is enhanced). As a result, the contrast of light and shadow can be strongly recognized by a viewer.

The section of the light reflective projection portion 20 is in a direction perpendicular to a surface direction of the decorative sheet 100. In a case where the light reflective projection portion 20 is continuous, the section of the light reflective projection portion 20 means a section when cut in a direction orthogonal to the continuous direction thereof. In a case where the light reflective projection portion 20 is a dot having a hemispherical shape, the section of the light reflective projection portion 20 is a section when cut so as to pass through the center of the sphere.

Further, the light reflective projection portion 20 is more preferably formed by using an ultraviolet curable resin composition. Accordingly, the light reflection effect can be obtained without damaging the surface of the light transmissive substrate 10. In addition, it becomes easier to devise a disposition and a shape of the light reflective projection portion 20, and the pattern obtained by the light reflective projection portion 20 can be diversified.

That is, as one method of forming the uneven portion which has been performed in the related art, the surface of the light transmissive substrate 10 is roughened to form unevenness on the surface of the light transmissive substrate 10. Therefore, the smoothness of the uneven surface was not sufficient and there was a tendency not to obtain a bright high-grade decorative sheet with a large contrast between light and shadow.

In addition, it is preferable that the light reflective projection portion 20 is formed by screen-printing an ink including the ultraviolet curable resin and then, curing the ink by irradiation with ultraviolet rays. Accordingly, it becomes easy to form the section of the light reflective projection portion 20 to have the substantially semicircular shape or the substantially semi-elliptical shape, and various patterns can be easily formed.

Here, in the related art, a method of forming unevenness on a transparent substrate was carried out, in which a mold which transmits ultraviolet rays is filled with an ink including the ultraviolet curable resin, and the mold adheres to a transparent substrate, followed by irradiation with ultraviolet rays to cure the ultraviolet curable resin inside the mold, and then, the mold is removed.

In this method, since it is necessary to remove the mold after ultraviolet irradiation, it was necessary to increase the degree of crosslinking of the ultraviolet curable resin to improve the mold separation. However, if the degree of crosslinking of the ultraviolet curable resin is increased, when the decorative sheet is formed and processed after the increase, there was a tendency for a crack to form in the pattern due to insufficient elongation of the light reflective projection portion. In addition, in this method, since the cost of the mold is high, it has been difficult to diversify the pattern.

On the contrary, in a case of forming the light reflective projection portion 20 by screen printing, since it is not necessary to consider the mold separation, all that high degree of crosslinking is not necessary. Therefore, it is possible to prevent cracks in the pattern by adjusting the mixing of the ink including the ultraviolet curable resin, when the decorative sheet 100 is formed and processed. In addition, various patterns can be formed by a simple method.

An average height of the light reflective projection portions 20 is preferably 1 μm to 200 μm and more preferably 5 μm to 100 μm.

When setting the average height of the light reflective projection portions 20 to be equal to or more than the lower limit value described above, it is possible to form the sectional shape of substantially semicircular shape or substantially semi-elliptical shape which is favorable for exhibiting the concave mirror effect. In addition, when formed by the screen printing, it is possible to make the surface of the light reflective projection portion 20 smoother by suppressing the influence of the screen gauze.

On the other hand, when setting the average height of the light reflective projection portions 20 to be equal to or less than the upper limit value described above, it is possible to prevent the air from mixing (bubbling) when formed by the screen printing.

The average height of the light reflective projection portions 20 is a length in the thickness direction of the decorative sheet 100, and it is preferable that the light reflective projection portion 20 is formed evenly. Specifically, it is preferable that the variation in height is within a range of 0.05 μm to 1.05 μm.

As a measurement method, the height is measured in accordance with JIS K 5600-1-7.

In addition, a width of the light reflective projection portion 20 is preferably within a range of 20 μm to 10 mm and more preferably within a range of 50 μm to 5 mm. The plurality of light reflective projection portions 20 may have the same width as each other or different widths from each other.

When setting the width of the light reflective projection portion 20 to be equal to or more than the lower limit value described above, the formation by the screen printing becomes easy. On the other hand, when setting the width of the light reflective projection portion 20 to be equal to or less than the upper limit value described above, it is possible to prevent a phenomenon (saddle phenomenon) that the vicinity of an apex of the light reflective projection portion 20 collapses from occurring when formed by the screen printing, and to maintain the shape of the light reflective projection portion 20 satisfactorily. As a result, the contrast between light and shadow becomes clear.

In a case where the light reflective projection portions 20 are continuous, the width of the light reflective projection portion 20 is the maximum value among the widths in a lengthwise direction when seen in a plan view. For example, in a case where the sectional shape of the light reflective projection portion 20 is substantially semicircular shape, the diameter of the semicircle corresponds to the width of the light reflective projection portion 20.

As a measurement method, the width can be measured, for example, using a digital microscope.

The height and width of the light reflective projection portion 20 are preferably adjusted within the ranges described above, according to preferences of design or the like. For example, when increasing the ratio of the height to the width, the directivity tends to increase. In a case where the light reflective projection portion 20 is formed by the screen printing, the height and the width of the light reflective projection portion 20 can be adjusted by changing a viscosity or the like of the ink including the ultraviolet curable resin composition, a thickness or the like of an emulsion of a screen plate.

The light reflective projection portion 20 may be colored with a pigment or the like on a condition that a constant transmittance is maintained. Accordingly, it is possible to realize a decorative sheet with a transparent feeling which has a large contrast between light and shadow and also emphasizes a colored pattern.

The black layer 30 is formed of a black ink. The black layer 30 absorbs light and functions as a layer exhibiting black color.

The black ink preferably includes a black pigment and a binder resin.

As the black pigment, any of an inorganic pigment or an organic pigment may be used, and examples thereof include carbon black, graphite, titanium black, and carbon nanotube. One kind of the black pigments may be used alone and two or more kinds thereof may be used in combination. Among these, from a viewpoint of obtaining a bright high-grade decorative sheet with a large contrast between light and shadow, it is preferable to include carbon black. From a viewpoint of improving printing properties, surfaces of these black pigments may be physically or chemically treated.

The black ink may include a pigment exhibiting a color, in addition to the black pigment.

A form of the black pigment is preferably a particle form.

An average of primary particle diameters of the black pigment is preferably equal to or more than 5 nm and more preferably equal to or more than 10 nm, and preferably equal to or less than 100 nm and more preferably equal to or less than 50 nm. By setting the average of primary particle diameters within the numerical ranges, a bright high-grade decorative sheet with a large contrast between light and shadow is obtained.

Examples of a measurement method of the average of primary particle diameters include a method in which a particle diameter is measured for each of several hundreds of black pigments from a primary particle image of the black pigment using a transmission electron microscope (TEM), and an average value is calculated.

The particle form includes a case of a carbon nanotube. In this case, a tube length of the carbon nanotube is preferably equal to or more than 5 nm and more preferably equal to or more than 10 nm, and preferably equal to or less than 100 nm and more preferably equal to or less than 50 nm.

A specific surface area of the black pigment is preferably equal to or more than 20 $m^2/g$ and more preferably equal to or more than 100 $m^2/g$. On the other hand, the specific surface area of the black pigment is preferably equal to or less than 2,000 $m^2/g$ and more preferably equal to or less than 1,000 $m^2/g$. By setting the specific surface area within the numerical ranges, a bright high-grade decorative sheet with the large contrast between light and shadow is obtained.

Regarding the measurement, the specific surface area can be measured in accordance with JIS Z 8830.

A content of the black pigment is preferably 4% to 60% by mass with respect to the total solid content of the black layer 30.

The binder resin is used to disperse the black pigment and form a printed coated film.

The binder resin is preferably one or more selected from a vinyl chloride-vinyl acetate copolymer resin, an acrylic resin, a polyester resin, an epoxy resin, a polycarbonate resin, a polyolefin resin, a cellulose resin, a maleic acid resin, a phenol resin, a polyurethane resin, a polyamide resin, a polyimide resin, a melamine resin, a phenoxy resin, a fluororesin, and an active energy ray-curable resin, and modified products thereof. Among these, the vinyl chloride-vinyl acetate copolymer resin, the acrylic resin, and the polyester resin are preferable.

The mixing ratio (weight ratio) of the black pigment and the binder resin in the black layer 30 is preferably 0.2:5 to 8:5, and more preferably 0.5:5 to 3.5:5, from a viewpoint of obtaining a bright high-grade decorative sheet with a large contrast between light and shadow.

A thickness of the black layer 30 is not particularly limited, and is preferably equal to or more than 1 μm and equal to or less than 30 μm.

In addition, the black layer 30 may include known components of additives for an ink. Examples of the known additives for an ink include a solvent, a stabilizer such as an antioxidant, a leveling agent, an antifoaming agent, a thickening agent, an anti-settling agent, a wet dispersant, an antistatic agent, surfactants such as an anti-fogging agent, and various additives such as a coupling agent, a silane coupling agent, and near infrared absorbing agent.

The decorative sheet 100 of the present invention further satisfies the following conditions. Accordingly, a bright high-grade decorative sheet with a large contrast between light and shadow is obtained.

In a dried coated film which is formed using the black ink by a film forming method below, a gloss value of a surface of the dried coated film, which is measured at a measurement angle of 60° in accordance with JIS Z 8741 (1997) is equal to or more than 80 and a lightness $L^*$ value of the surface of the dried coated film in the CIE 1976 ($L^*$, $a^*$, and $b^*$) color system, which is measured by an SCE method is equal to or less than 10.

Film forming method of dried coated film: The black ink is applied to a polyethylene terephthalate film by using a bar coater having a wire diameter of 6 mil by pulling at a moving speed of 50 mm/sec and then dried at 80° C. for 15 minutes to obtain a dried coated film.

Details of a mechanism by which this effect is obtained are not clear, but it is presumed as follows.

Figure 2:
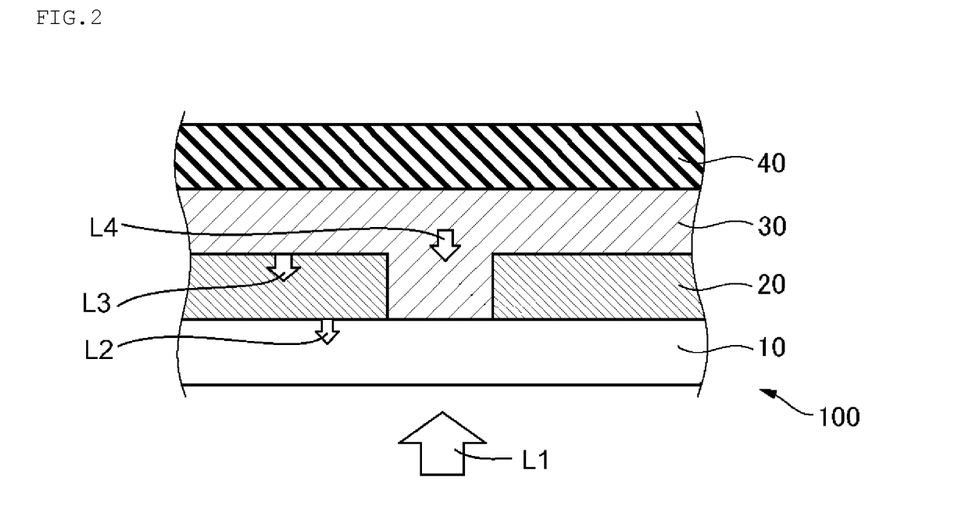
FIG. 2 is a schematic sectional diagram for illustrating a mechanism of light effect by the decorative sheet according to the present embodiment.

FIG. 2 shows an example of the reflection of light, when the decorative sheet 100 is viewed from the light transmissive substrate 10 side, that is, when the light was incident from the light transmissive substrate 10 side of the decorative sheet 100.

As shown in FIG. 2, incident light L1 which is incident on the upper surface of the light transmissive substrate 10 passes through the light transmissive substrate 10, and is divided into reflected light L2 which is reflected at an interface between the light transmissive substrate 10 and the light reflective projection portion 20, reflected light L3 which is reflected at an interface between the light reflective projection portion 20 and the black layer 30, as well as light incident on the black layer 30.

Here, since the decorative sheet 100 of the present invention includes the black layer 30 using the black ink satisfying a predetermined condition, the light incident on the black layer 30 is divided into light absorbed in the black layer 30 and reflected light L4 which is reflected at an interface between the black pigment and the binder resin included in the black ink inside the black layer 30. The light absorbed in the black layer 30 also includes light absorbed in the black layer 30 after reflected at the interface between the black pigment and the binder resin. As a result, in the decorative sheet 100 of the present invention, light combined with the reflected light L4 is visually recognized, in addition to the reflected light L2 and the reflected light L3.

When forming the black layer 30 by using the black ink satisfying a predetermined condition, wetting of binder resin with respect to the black pigment included in the black ink is improved, and the interface has good smoothness. Therefore, it is considered that the reflected light L4 does not diffuse and reflect largely at the interface between the black pigment and the binder resin, and is directed toward the light transmissive substrate 10 side while having a certain amount of light. At least some of the reflected light L4 improve the visibility of the reflected light L3 although the specific mechanism is not clear.

In addition, when the black layer 30 is formed by using the black ink satisfying a predetermined condition, the light mainly not directed toward the light transmissive substrate 10 side among the light reflected at the interface between the black pigment and the binder resin is sufficiently absorbed in the black layer, and in addition to this, slightly diffused light generated at the interface, the surface of the light reflective projection portion 20, and the like is also sufficiently absorbed at the black layer 30.

Accordingly, it is presumed that, according to the decorative sheet 100 of the present invention, an effect that the contrast between light and shadow is large which was no in the related art is obtained.

The bright high-grade decorative sheet with a large contrast between light and shadow means a decorative sheet in which, when the decorative sheet 100 is seen from the light transmissive substrate 10 side, deep or luster black as the lacquer is used as a background, the pattern obtained by using the light reflective projection portion 20 shines light, and the pattern seen greatly changes depending on the viewing angle, thereby having a further increased sense of depth.

Further, in the decorative sheet 100 of the present invention, the light reflective projection portion 20 and the black layer 30 are in contact with each other. Accordingly, light due to the reflected light L3 which is reflected at the interface between the light reflective projection portion 20 and the black layer 30 is emphasized to further enhance the contrast between light and shadow.

In addition, in order to make the gloss value of the dried coated film formed by the above film forming method equal to or more than 80 and to make the L* value equal to or less than 10, it is important to devise a manufacturing method as follows.

(i) Particle diameter of black pigment (aggregate)

(ii) Combination of black pigment, binder resin, and additives (iii) Mixing condition of black ink, such as stirring speed, stirring temperature, and stirring time In general, it is known that as the particle diameter of the black pigment (aggregate) in the black ink is smaller, the L* value can be reduced. Here, the expression that the particle diameter is small means a state where the wettability is good to some extent, but in order to increase the gloss value, the wettability has to be further improved. In addition, depending on a combination pattern of the black pigment and the binder resin, in a case where the wetting is not sufficient, in a case where the distribution state of the black pigment in the binder resin is not uniform, or the like, it becomes difficult to sufficiently reduce the L* value and increase the gloss value. In such a case, it is important to select an appropriate dispersant and to use what kind of dispersing equipment to disperse under what dispersion condition.

Therefore, by highly controlling the conditions (i) to (iii), the decorative sheet 100 of the present invention has, at last, a configuration in which the L* value is equal to or less than 10 and the gloss value is equal to or more than 80.

In addition, the decorative sheet 100 of the present invention preferably has the gloss value of equal to or more than 100 and the L* value of equal to or less than 2, under the above conditions. Accordingly, a bright high-grade decorative sheet with a large contrast between light and shadow is more stably and effectively obtained. The decorative sheet 100 having the gloss value of equal to or more than 100 and the L* value of equal to or less than 2 under the conditions can be obtained by a manufacturing method similarly as described above.

Further, the decorative sheet 100 may further include the protective layer 40, as desired. The protective layer 40 is disposed on a surface on a black layer 30 side of the decorative sheet 100, and has a function of imparting hiding power in a case where scratch resistance and hiding power of the black layer 30 is not sufficient, and the heat resistance in a case of inside molding, to the decorative sheet 100. The protective layer 40 preferably includes a black pigment such as carbon black.

In addition, the protective layer 40 is formed, for example, by using an ink including a thermoplastic resin or ultraviolet curable resin by coating with a known method such as screen printing.

In addition, the protective layer 40 may include various additives. Examples of various additives include an ultraviolet absorber, alight stabilizer, an inorganic particle, a polymerization inhibitor, a crosslinking agent, an antistatic agent, an adhesion improver, an antioxidant, a leveling agent, a thixotropic agent, a coupling agent, a plasticizer, a defoaming agent, a filler, and a solvent.

Next, an example of a manufacturing method of the decorative sheet 100 will be described.

First, a light transmissive substrate 10 is prepared. Next, on the light transmissive substrate 10, an ink including an ultraviolet curable resin composition is applied by screen printing, for example, using a screen plate having a mesh number of 420 and an emulsion thickness of 5 μm. Subsequently, the ink including the applied ultraviolet curable resin composition is irradiated with ultraviolet rays to be cured to obtain the light reflective projection portion 20. Accordingly, the light reflective projection portion 20 having a smooth surface and a substantially semicircular or substantially semi-elliptical sectional shape is obtained, and a bright high-grade decorative sheet with a large contrast between light and shadow is more easily obtained.

Next, a black ink is applied by printing on the light reflective projection portion 20. In this case, when a highly soluble solvent is used as a solvent in the black ink, the surface of the light reflective projection portion 20 or a portion where the surface of the light transmissive substrate 10 is in contact with the surface of the light reflective projection portion 20 may be affected in some cases. Therefore, a solvent in the black ink is preferably low in solubility. Examples of the solvent low in solubility include an alcohol solvent.

Then, the black layer 30 can be obtained by drying the applied black ink.

Thereafter, by further forming the protective layer 40 on the black layer 30 by a known method, the decorative sheet 100 is obtained. The decorative sheet 100 of the present invention can be widely used in various fields where the decorativeness to be described later is required.

<Decorative Molded Article>

A decorative molded article of the present invention includes, on a surface, the decorative sheet 100. The decorative molded article is used as various surface painting requiring the decorativeness, and examples of application include electronic devices such as smartphone, a tablet, a personal computer, and a liquid crystal television, furniture, a miscellaneous good, and an interior of a vehicle.

When creating the decorative molded article, in a case of performing insert molding processing, a bonding layer is provided on the protective layer 40. The bonding layer is formed, for example, by using an ink including a thermoplastic resin by coating with screen printing.

Hereinabove, although the embodiments of the present invention have been described with reference to FIGS. 1 and 2, these are examples of the present invention, and various configurations other than the above can be adopted. Hereinafter, modification examples of the present invention will be described using FIGS. 3 to 5.

Figure 3:
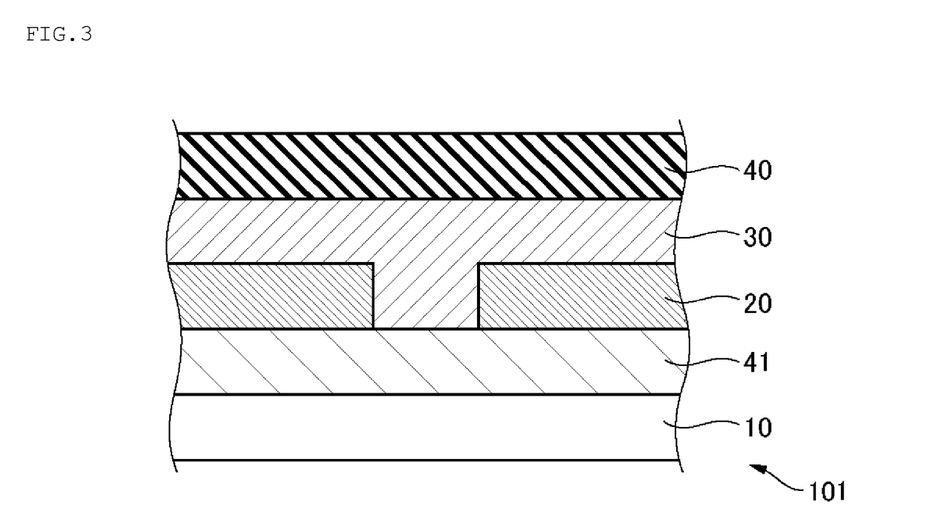
FIG. 3 is a schematic sectional view showing a modification example of the decorative sheet according to the present embodiment.

In addition, FIG. 3 shows a decorative substrate 101 in which the light transmissive substrate 10, a transparent layer 41, the light reflective projection portion 20 formed on the transparent layer 41, the black layer 30, and the protective layer 40 are laminated in this order.

The transparent layer 41 has light transmittance similar to that of the light reflective projection portion 20 and may be either colorless or colored.

The transparent layer 41 can be formed by using an ink including a certain resin. In a case where the transparent layer 41 is colored, a pigment or the like for coloring is not particularly limited, as long as the pigment does not impair transparency. A phthalocyanine pigment such as phthalocyanine blue and phthalocyanine green, an azo pigment such as azo yellow lake, azo lake red, and monoazo yellow, a polycyclic pigment such as a quinacridone pigment, a perylene pigment, a quinophthalone pigment, and an anthraquinone pigment, and an inorganic pigment or an organic pigment such as ultramarine, cobalt, a red iron oxide, a titanium oxide, a nickel titanium yellow, and chromium titanium yellow are preferable. A hue of the transparent layer 41 is not particularly limited, and examples thereof include sky blue, blue, and yellow.

Accordingly, it is possible to obtain a decorative sheet with a transparent feeling which has a large contrast between light and shadow and also emphasizes a colored pattern by coloring the transparent layer 41. In addition, when a resin having good adhesion with the light transmissive substrate 10 is used for the transparent layer 41, it is possible to improve adhesion with respect to the light transmissive substrate 10 to which an ink including an ultraviolet curable resin to form the light reflective projection portion 20 is difficult to adhere. Further, in a case where the black layer 30 includes a highly soluble solvent, the transparent layer 41 is made without such a highly soluble solvent. Accordingly, it is possible to make the surface of the light transmissive substrate 10 not be affected. Therefore, it is possible to prevent the contrast between light and shadow from becoming reduced as a result.

Figure 4:
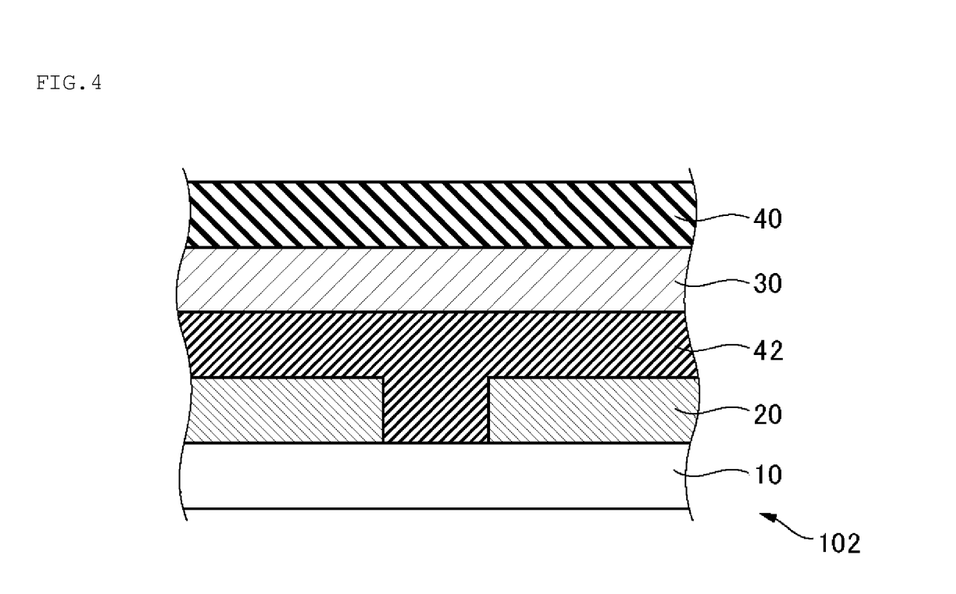
FIG. 4 is a schematic sectional diagram showing a modification example of the decorative sheet according to the present embodiment.

FIG. 4 shows a decorative sheet 102 in which the light transmissive substrate 10, the light reflective projection portion 20 formed on the light transmissive substrate 10, a colored transparent layer 42, the black layer 30, and the protective layer 40, in this order.

The colored transparent layer 42 has light transmittance similar to that of the light reflective projection portion 20. The colored transparent layer 42 can be formed by using an ink including a certain resin. A pigment or the like for coloring the coloring the colored transparent layer 42 are not particularly is not particularly limited, as long as the pigment does not impair transparency. A phthalocyanine pigment such as phthalocyanine blue and phthalocyanine green, an azo pigment such as azo yellow lake, azo lake red, and monoazo yellow, a polycyclic pigment such as a quinacridone pigment, a perylene pigment, a quinophthalone pigment, and an anthraquinone pigment, and an inorganic pigment or an organic pigment such as ultramarine, cobalt, a red iron oxide, a titanium oxide, a nickel titanium yellow, and chromium titanium yellow are preferable. The hue of coloring is not particularly limited, and examples thereof include sky blue, blue, and yellow. A thickness of the colored transparent layer 42 is not particularly limited, and is preferably equal to or more than 0.5 μm and equal to or less than 30 μm.

According to the decorative sheet 102, a decorative sheet with a transparent feeling which has a large contrast between light and shadow and also emphasizes a colored pattern is obtained by providing the colored transparent layer 42 on a background using the black layer 30.

Figure 5:
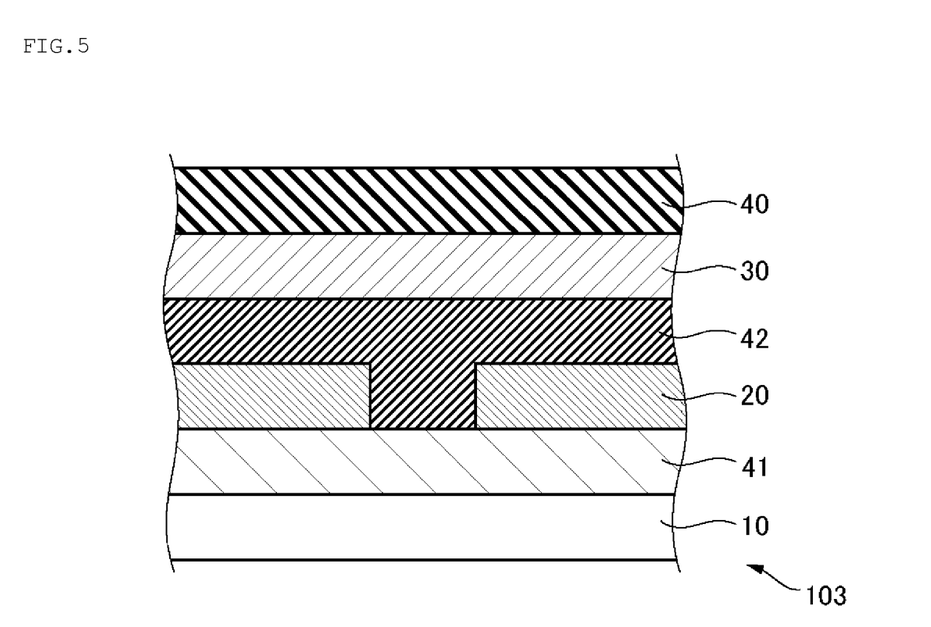
FIG. 5 is a schematic sectional diagram showing a modification example of the decorative sheet according to the present embodiment.

In addition, FIG. 5 shows a decorative sheet 103 in which the light transmissive substrate 10, the transparent layer 41, the light reflective projection portion 20 formed on the transparent layer 41, the colored transparent layer 42, the black layer 30, and the protective layer 40 are laminated in this order.

The transparent layer 41 and the colored transparent layer 42 have the same configuration as described above. Accordingly, a decorative sheet with a transparent feeling in which adhesion to the substrate improves, a contrast between light and shadow is large and a colored pattern is emphasized is obtained.

Hereinabove, although the embodiments of the present invention have been described with reference to the drawings, these are examples of the present invention, and various configurations other than the above can be adopted.

EXAMPLES

Next, the present invention will be described in detail using Examples, but contents of the present invention are not limited to Examples.

[Production of Black Ink]

Each black ink of a composition shown in Tables 1 to 3 was prepared.

Each black ink of Examples and Comparative Examples was prepared by the following procedure.

First, a dispersion of carbon black K (black pigment (P)) was prepared. Specifically, 350 g of carbon black K, 896 g of butyl cellosolve (solvent (S)), 140 g of dispersant L (dispersant (D)), and 14 g of dispersant M (dispersant (D)) were mixed at this ratio, and the mixture was dispersed for 5 hours with a bead mill (LMZ015, manufactured by Ashizawa Finetech Ltd.) to prepare a dispersion of carbon black K in advance. Next, black ink was prepared by mixing this dispersion with a binder resin (binder resin (R)) and cyclohexanone (solvent (S)) at the ratio described in Table 1. When performing the dispersing with the bead mill, zirconia beads having a particle diameter of 0.3 mm were used as a dispersion medium.

In Example 7, the same dispersion was used and preparation was made at a ratio to be described later. In addition, in Examples 8 to 13, and Comparative Examples 1 and 4 to 6, as described later, the dispersion was not used.

In the black ink of Example 7, a dispersion of carbon black K was prepared in advance in the same manner as in Example 1 described above. Next, a black ink was prepared by mixing this dispersion with a binder resin and a solvent L so as to have a composition shown in Table 1.

For black inks of Examples 8 to 13, the dispersion of the carbon black K was not used. Specifically, premixing was performed after each raw material was mixed so as to have a composition shown in Table 2. Then, dispersing was performed by using a three-roll mill dispersing device (SDY-200 type, manufactured by Buhler Corporate) under conditions that linear pressure per roll length is 40 N/mm and the pass number is thrice, to obtain the black ink.

In addition, the following evaluations were performed for each obtained black ink. Results are shown in Tables 1 and 2.

Measurement of Gloss Value and L* Value of Dried Coated Film

Each black ink having the composition shown in Tables 1 and 2 was applied to a polyethylene terephthalate film by using a bar coater having a wire diameter of 6 mil (Bar No. 2 (wire diameter: 6 mil), manufactured by Rk Printcoat Instruments Ltd.) by pulling at a moving speed of 50 mm/sec and then dried at 80° C. for 15 minutes to obtain a dried coated film.

With respect to the obtained dried coated film, the gloss value of a surface of the dried coated film was measured at a measurement angle of 60° in accordance with JIS Z 8741 (1997). Further, a lightness L* value of the surface of the dried coated film in the CIE 1976 (L*, a*, and b*) color system was measured by an SCE method.

Polyethylene Terephthalate Film: PET Film which was Easy Adhesion Treated (COSMOSHINE (registered trademark) A4300 (thickness: 188 μm), manufactured by TOYOBO Co., LTD.)

Measurement Conditions of Blackness (L* Value)

Equipment used: Image spectrophotometer "COLOR-7X" (manufactured by Kurabo Industries, Ltd.)

Color management system (software): "AUCOLOR-T2"

Color system: CIE 1976 (L*, a*, and b*)

Measurement method: SCE (regular reflection light removal) method

Light source: D65 standard light source

Viewing angle: 10°

Measurement Conditions of Gloss Value

Equipment used: Handy type gloss meter "PG-1M" (manufactured by Nippon Denshoku Industries Co., Ltd.)

With reference to JIS Z 8741 (1997) Incident angle: 60°

Example 1

[Production of Decorative Sheet]

Using the black ink obtained above, a decorative sheet was produced.

First, a light transmissive substrate (PET film which was easy adhesion treated (COSMOSHINE (r) A4300 (thickness: 188 μm), manufactured by TOYOBO Co., LTD.)) was prepared. Next, on the light transmissive substrate, an ink including an ultraviolet curable resin composition (obtained by mixing UV 5410-7 and High Deposit Medium NC UV Y0165, manufactured by Seiko advance Ltd.) was screen printed using a screen plate in which a spin pattern with a line width of 80 μm and an interline distance of 80 μm was formed, a mesh number was 420, and an emulsion thickness was 5 μm. Subsequently, the applied ink including the ultraviolet curable resin composition was irradiated with ultraviolet rays to be cured (curing conditions: lamp (metal halide lamp) 120 W/cm, 2 lights, line speed of 9.2 m/min, distance to object of 135 mm, peak light quantity of 480 mW/cm$^2$, and integrated light quantity of 500 mJ/cm$^2$) to obtain a light reflective projection portion.

Next, on the light reflective projection portion, the black ink obtained above was applied by using a bar coater having a wire diameter of 6 mil (Bar No. 2 (wire diameter: 6 mil), manufactured by Rk Printcoat Instruments Ltd.) by pulling at a moving speed of 50 mm/sec.

Then, the applied black ink was dried at 80° C. over 15 minutes to form a black layer and obtain the decorative sheet.

Examples 2 to 13

A decorative sheet was obtained in the same manner as in Example 1, except that the black ink was prepared with the composition shown in Tables 1 and 2.

Comparative Example 1

When preparing the black ink, the dispersion of the carbon black K was not used. Specifically, premixing was performed after each raw material was mixed so as to have a composition shown in Table 1. Then, dispersing was performed by using a three-roll mill dispersing device (SDY-200 type, manufactured by Bühler Corporate) under conditions that linear pressure per roll length is 40 N/mm and the pass number is once, to obtain the black ink. Thereafter, in the same manner as in Example 1, a decorative sheet was obtained.

Comparative Examples 2 and 3

A decorative sheet was obtained in the same manner as in Example 1, except that the black ink was prepared with the composition shown in Tables 1 and 2.

Comparative Examples 4 and 5

A decorative sheet was obtained in the same manner as in Example 1, except that the black ink shown in Table 1 was used as it was. "KKS RX001 710 Black, manufactured by Seiko advance Ltd." used in Comparative Example 4 corresponded to "KKY 710 Black, manufactured by Seiko advance Ltd." described in Example of Patent Document 1.

Comparative Example 6

When preparing the black ink, the dispersion of the carbon black K was not used. Specifically, premixing was performed after each raw material was mixed so as to have a composition shown in Table 2. Then, dispersing was performed by using a three-roll mill dispersing device (SDY-200 type, manufactured by Buhler Corporate) under conditions that linear pressure per roll length is 40 N/mm and the pass number is thrice, to obtain the black ink. Thereafter, in the same manner as in Example 1, a decorative sheet was obtained.

<Evaluation>

The decorative sheets obtained in Examples and Comparative Examples were measured and evaluated as follows. Results are shown in Tables 1 and 2.

Measurement of Height of Light Reflective Projection Portion

Measurement was performed at five portions by using a shape measurement laser microscope (VK-X100, manufactured by Keyence Corporation), and an average value (μm) thereof was obtained. Specifically, after determining a measurement field of view with a 20× objective lens (when multiplied by the eyepiece magnification of 20×, the lens magnification is 400×), a laser image of a surface shape of the light reflective projection portion is measured at five portions, and an average value thereof was calculated.

Measurement of Width of Light Reflective Projection Portion

Measurement was performed at five portions at a magnification of 450× using a digital microscope (VHX-100F, manufactured by Keyence Corporation), and an average value (μm) thereof was obtained. Specifically, on the operation screen, a tangent line was drawn at one end of a line of a spin pattern formed by the light reflective projection portion, the other end portion is specified in a direction perpendicular to the tangent line, and a distance between the end portions was measured to obtain a numerical value of the width. Measurement was performed at five portions with this procedure, an average value was calculated.

Measurement of OD Value

Measurement was performed at three portions by using a transmission densitometer (341C, manufactured by X-Rite Inc.), and an average value thereof was obtained.

Evaluation of Design

The decorative sheet was irradiated with light of three wavelength daylight white fluorescent light (FPL 27 EX-N, manufactured by NEC Lighting Ltd.) from the diagonally above on a light transmissive substrate side. When five expert panelists observed the decorative sheet from the light transmissive substrate side, while rotating within a range of approximately plus or minus 30 degrees from a horizontal position, "bright high-grade decorative sheet property with a large contrast of light and shadow" was evaluated in 5 levels (5 is the best). Specifically, three items of "jet blackness", "luminance feeling of a pattern", and "magnitude of a change in a pattern seen when moving a decorative sheet so as to rotate" were observed, and comprehensively evaluated in five levels. Then, an average value of the evaluation performed by the five expert panelists was calculated, and those that rounded off to the first decimal place were used as evaluation points, and evaluated according to the following criteria.

A Evaluation point is 5 to 4
B Evaluation point is 3 to 2
C Evaluation point is equal to or less than 1

TABLE 1

| | (Part by mass) | Example 1 | Example 2 | Example 3 | Example 4 | Example 5 | Example 6 |
|---|---|---|---|---|---|---|---|
| Resin (R) | Vinyl chloride-vinyl acetate copolymer resin A | 20.0 | | | | | |
| | Vinyl chloride-vinyl acetate copolymer resin B | | 20.0 | | | | |
| | Vinyl chloride-vinyl acetate copolymer resin C | | | 20.0 | | | |
| | Polyester resin D | | | | 20.0 | | |
| | Fluororesin E | | | | | 20.0 | |
| | Epoxy resin F | | | | | | 20.0 |
| | Acrylic resin G | | | | | | |
| | Acrylic resin H | | | | | | |
| | Styrene acrylic resin J | | | | | | |
| Black pigment (P) | Carbon black K (Average of primary particle diameters of 24 nm) | 8.3 | 8.3 | 8.3 | 8.3 | 8.3 | 8.3 |
| Solvent (S) | Butyl cellosolve Solvent L | 21.4 | 21.4 | 21.4 | 21.4 | 21.4 | 21.4 |
| | Cyclohexane | 46.7 | 46.7 | 46.7 | 46.7 | 46.7 | 46.7 |
| Dispersant (D) | Dispersant L | 3.3 | 3.3 | 3.3 | 3.3 | 3.3 | 3.3 |
| | Dispersant M | 0.3 | 0.3 | 0.3 | 0.3 | 0.3 | 0.3 |
| | Dispersant N | | | | | | |
| Ink | KKS RX001 710 Black STR (Z) concentrated 710 Black | | | | | | |
| Total | | 100.0 | 100.0 | 100.0 | 100.0 | 100.0 | 100.0 |
| | Use or not dispersion | use | use | use | use | use | use |
| | Black pigment (P)/Resin (R) | 0.42 | 0.42 | 0.42 | 0.42 | 0.42 | 0.42 |
| Index | L* value | 2.16 | 1.58 | 1.76 | 1.80 | 2.59 | 0.56 |
| | Gloss value | 116.40 | 122.90 | 120.40 | 154.60 | 84.70 | 119.00 |

TABLE 1-continued

| | | | | | | | |
|---|---|---|---|---|---|---|---|
| Evaluation | Height of light reflective projection portion (μm) | 7.1 | 7.1 | 7.1 | 7.1 | 7.1 | 7.1 |
| | Width of light reflective projection portion (μm) | 125.6 | 125.6 | 125.6 | 125.6 | 125.6 | 125.6 |
| | OD value | 2.95 | 2.88 | 3.00 | 3.42 | 3.03 | 3.19 |
| | Design | B | B | B | A | B | B |

| | (Part by mass) | Example 7 | Comparative Example 1 | Comparative Example 2 | Comparative Example 3 | Comparative Example 4 | Comparative Example 5 |
|---|---|---|---|---|---|---|---|
| Resin (R) | Vinyl chloride-vinyl acetate copolymer resin A | | | | | | |
| | Vinyl chloride-vinyl acetate copolymer resin B | | | | | | |
| | Vinyl chloride-vinyl acetate copolymer resin C | | | | | | |
| | Polyester resin D | | 20.0 | | | | |
| | Fluororesin E | | | | | | |
| | Epoxy resin F | | | | | | |
| | Acrylic resin G | 49.1 | | | | | |
| | Acrylic resin H | | | 20.0 | | | |
| | Styrene acrylic resin J | | | | 20.0 | | |
| Black pigment (P) | Carbon black K (Average of primary particle diameters of 24 nm) | 2.3 | 8.3 | 8.3 | 8.3 | | |
| Solvent (S) | Butyl cellosolve | 5.8 | 21.4 | 21.4 | 21.4 | | |
| | Solvent L | 41.8 | | | | | |
| | Cyclohexane | | 46.7 | 46.7 | 46.7 | | |
| Dispersant (D) | Dispersant L | 0.9 | 3.3 | 3.3 | 3.3 | | |
| | Dispersant M | 0.1 | 0.3 | 0.3 | 0.3 | | |
| | Dispersant N | | | | | | |
| Ink | KKS RX001 710 Black | | | | | 100.0 | |
| | STR (Z) concentrated 710 Black | | | | | | 100.0 |
| Total | | 100.0 | 100.0 | 100.0 | 100.0 | 100.0 | 100.0 |
| | Use or not dispersion | use | not | use | use | not | not |
| | Black pigment (P)/Resin (R) | 0.05 | 0.42 | 0.42 | 0.42 | — | — |
| Index | L* value | 5.01 | 11.04 | 11.35 | 14.81 | 19.92 | 22.35 |
| | Gloss value | 87.50 | 62.80 | 63.30 | 92.40 | 77.90 | 53.80 |
| Evaluation | Height of light reflective projection portion (μm) | 7.1 | 7.1 | 7.1 | 7.1 | 7.1 | 7.1 |
| | Width of light reflective projection portion (μm) | 125.6 | 125.6 | 125.6 | 125.6 | 125.6 | 125.6 |
| | OD value | 1.62 | 2.91 | 2.01 | 2.09 | 6.13 | 6.26 |
| | Design | B | C | C | C | C | C |

TABLE 2

| | (Part by mass) | Example 8 | Example 9 | Example 10 | Example 11 | Example 12 | Example 13 | Comparative Example 6 |
|---|---|---|---|---|---|---|---|---|
| Resin (R) | Vinyl chloride-vinyl acetate copolymer resin A | 20.0 | 20.0 | 20.0 | | | | |
| | Vinyl chloride-vinyl acetate copolymer resin B | | | | | | | |

TABLE 2-continued

| (Part by mass) | | Example 8 | Example 9 | Example 10 | Example 11 | Example 12 | Example 13 | Comparative Example 6 |
|---|---|---|---|---|---|---|---|---|
| | Vinyl chloride-vinyl acetate copolymer resin C | | | | | | | |
| | Polyester resin D | | | | 20.0 | 20.0 | 10.0 | 20.0 |
| | Fluororesin E | | | | | | | |
| | Epoxy resin F | | | | | | | |
| | Acrylic resin G | | | | | | | |
| | Acrylic resin H | | | | | | | |
| | Styrene acrylic resin J | | | | | | | |
| Black pigment (P) | Carbon black K (Average of primary particle diameters of 24 nm) | 8.3 | 8.3 | 8.3 | 8.3 | 8.3 | 15.0 | 8.3 |
| Solvent (S) | Butyl cellosolve | 21.4 | 21.4 | 21.4 | 21.4 | 21.4 | 38.4 | 21.4 |
| | Solvent L | | | | | | | |
| | Cyclohexane | 46.7 | 46.7 | 46.7 | 46.7 | 46.7 | 23.3 | 46.7 |
| Dispersant (D) | Dispersant L | 3.3 | | | 3.3 | | 6.0 | |
| | Dispersant M | 0.3 | | | 0.3 | | 0.6 | |
| | Dispersant N | | 3.3 | | | 1.0 | | |
| Ink | KKS RX001 710 Black | | | | | | | |
| | STR (Z) concentrated 710 Black | | | | | | | |
| Total | | 100.0 | 99.7 | 96.4 | 100.0 | 97.4 | 93.3 | 96.4 |
| | Use or not dispersion | not | not | not | not | not | not | not |
| | Black pigment (P)/Resin (R) | 0.42 | 0.42 | 0.42 | 0.42 | 0.42 | 1.50 | 0.42 |
| Index | L* value | 5.33 | 8.06 | 8.84 | 3.69 | 8.51 | 5.01 | 16.51 |
| | Gloss value | 105.70 | 97.40 | 86.90 | 149.90 | 84.70 | 138.90 | 50.10 |
| Evaluation | Height of light reflective projection portion (μm) | 7.1 | 7.1 | 7.1 | 7.1 | 7.1 | 7.1 | 7.1 |
| | Width of light reflective projection portion (μm) | 125.6 | 125.6 | 125.6 | 125.6 | 125.6 | 125.6 | 125.6 |
| | OD value | 3.72 | 5.60 | 4.74 | 4.39 | 5.00 | 5.04 | 3.67 |
| | Design | B | B | B | A | B | B | C |

TABLE 3

| Name of raw material | Manufacturer name | Product name or the like |
|---|---|---|
| Vinyl chloride-vinyl acetate copolymer resin A | Nissin Chemical co., ltd. | SOLBIN A |
| Vinyl chloride-vinyl acetate copolymer resin B | Nissin Chemical co., ltd. | SOLBIN B |
| Vinyl chloride-vinyl acetate copolymer resin C | Nissin Chemical co., ltd. | SOLBIN M5 |
| Polyester resin D | Evonik Japan Co., Ltd. | TEGO ® AddBond LTH |
| Fluororesin E | AGC Inc. | LUMIFLON LF200F (Solid content of 98% or more) |
| Epoxy resin F | Mitsubishi Chemical Corporation | JER 1004 |
| Acrylic resin G | TAISEI FINE CHEMICAL CO, .LTD. | 6HY-316 (Resin component) |
| Acrylic resin H | Mitsubishi Chemical Corporation | BR-115 |
| Styrene acrylic resin J | FUJIKURA KASEI CO., LTD. | Acryl base MH-7001 |
| Carbon black K | Mitsubishi Chemical Corporation | MA8 |
| Butyl cellosolve | KH Neochem Co., Ltd. | Butycell |
| Solvent L | TAISEI FINE CHEMICAL CO, .LTD. | 6HY-316 (Resin component) |
| Cyclohexane | UBE INDUSTRIES, LTD. | Cyclohexanone |
| Dispersant L | Lubrizol Corporation, Japan | Solsperse ® 32000 |
| Dispersant M | Lubrizol Corporation, Japan | Solsperse ® 5000 |
| Dispersant N | BASF Japan | EfkaO PX 4701 |
| KKS RX001 710 Black | Seiko advance Ltd. | — |
| STR(Z) concentrated 710 Black | Seiko advance Ltd. | — |

Priority is claimed on Japanese Patent Application No. 2017-137738, filed on Jul. 14, 2017, the entire disclosure of which is incorporated herein.

The invention claimed is:

1. A decorative sheet comprising:
a light transmissive substrate which is sheet-like or plate-like; a light reflective projection portion formed over the light transmissive substrate; and a black layer formed over the light reflective projection portion,
wherein the light reflective projection portion is formed of an ultraviolet curable resin composition,
wherein an average height of the light reflective projection portions is 1 to 200 μm, wherein the black layer is formed by using a black ink,
wherein the black ink includes a black pigment and a binder resin, and
wherein the black ink satisfies conditions below:
in a dried coated film which is formed using the black ink by a film forming method below, a gloss value of a surface of the dried coated film, which is measured at a measurement angle of 60° in accordance with JIS Z 8741 (1997) is equal to or more than 80 and a lightness $L^*$ value of the surface of the dried coated film in the CIE 1976 ($L^*$, $a^*$, and $b^*$) color system, which is measured by an SCE method is equal to or less than 10;
film forming method of dried coated film: the black ink is applied to a polyethylene terephthalate film by using a bar coater having a wire diameter of 6 mil by pulling at a moving speed of 50 mm/sec and then dried at 80° C. for 15 minutes to obtain a dried coated film.

2. The decorative sheet according to claim 1,
wherein a mixing ratio (weight ratio) of the black pigment and the binder resin is 0.2:5 to 8:5.

3. The decorative sheet according to claim 1,
wherein the black pigment includes carbon black.

4. A decorative molded article comprising, on a surface thereof, the decorative sheet according to claim 1.

5. The decorative sheet according to claim 1,
wherein the binder resin comprises at least one selected from a vinyl chloride-vinyl acetate copolymer resin, an acrylic resin, a polyester resin, an epoxy resin, a polycarbonate resin, a polyolefin resin, a cellulose resin, a maleic acid resin, a phenol resin, a polyurethane resin, a polyamide resin, a polyimide resin, a melamine resin, a phenoxy resin, a fluororesin, an active energy ray-curable resin, and modified products thereof.

* * * * *